US011658554B2

(12) United States Patent
Ma et al.

(10) Patent No.: US 11,658,554 B2
(45) Date of Patent: May 23, 2023

(54) VIBRATING WITH STOP MAGNETS, MANDREL AND GUIDING MEMBER

(71) Applicant: AAC Technologies Pte. Ltd., Singapore (SG)

(72) Inventors: Jie Ma, Shenzhen (CN); Zhiyong Cui, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 265 days.

(21) Appl. No.: 16/945,924

(22) Filed: Aug. 2, 2020

(65) Prior Publication Data
US 2020/0412224 A1   Dec. 31, 2020

Related U.S. Application Data

(63) Continuation of application No. PCT/CN2019/094084, filed on Jun. 30, 2019.

(51) Int. Cl.
*H02K 33/18*   (2006.01)
(52) U.S. Cl.
CPC .................................... *H02K 33/18* (2013.01)
(58) Field of Classification Search
CPC .. H02K 7/1869; H02K 7/1876; H02K 7/1892; H02K 33/00; H02K 33/02; H02K 33/16; H02K 35/02; G06F 3/016; G06F 3/03545
USPC ........ 310/25, 15, 12.01, 81, 80, 321, 20, 21, 310/28–30, 36–37, 40 MM
See application file for complete search history.

(56) References Cited

U.S. PATENT DOCUMENTS

| | | | | |
|---|---|---|---|---|
| 4,689,973 A * | 9/1987 | Hershberger | ......... | D06F 37/304 68/23.7 |
| 4,700,096 A * | 10/1987 | Epars | .................... | H02K 1/2773 310/156.61 |
| 5,231,337 A * | 7/1993 | van Namen | ........... | H02K 33/18 318/128 |
| 5,773,910 A * | 6/1998 | Lange | .................. | H02K 21/125 310/90 |
| 6,323,568 B1 * | 11/2001 | Zabar | ..................... | H02K 33/04 310/12.24 |
| 6,323,572 B1 * | 11/2001 | Kinoshita | ............ | H02K 1/2766 310/156.55 |
| 6,326,706 B1 * | 12/2001 | Zhang | ................... | F04B 35/045 310/12.32 |
| 6,644,943 B1 * | 11/2003 | Lilie | ..................... | F04B 35/045 417/418 |

(Continued)

*Primary Examiner* — Maged M Almawri
(74) *Attorney, Agent, or Firm* — W&G Law Group

(57) ABSTRACT

The present invention provides a vibration motor including: a housing having a receiving space; a vibrator received in the receiving space; coils configured to drive the vibrator to reciprocate; and two stop assemblies received in the receiving space and spaced apart from each other, the vibrator reciprocates between the two stop assemblies and includes first magnets spaced apart from each other and at least one second magnet arranged between the first magnets, every two adjacent first magnets of the first magnets have opposite magnetization directions, and a magnetization direction of the second magnets is perpendicular to a magnetization direction of the at least one first magnet. Compared with the related art, the vibration motor provided by the present invention has higher reliability.

12 Claims, 11 Drawing Sheets

(56) References Cited

U.S. PATENT DOCUMENTS

| | | | | |
|---|---|---|---|---|
| 6,737,780 B1* | 5/2004 | Fisher | H02K 1/17 | 310/154.14 |
| 7,262,526 B2* | 8/2007 | Shiga | H02K 15/03 | 310/156.28 |
| 7,573,163 B2* | 8/2009 | Tu | H02K 39/00 | 310/12.21 |
| 7,671,493 B2* | 3/2010 | Takashima | G06F 3/016 | 310/15 |
| 7,859,144 B1* | 12/2010 | Sahyoun | H02K 33/16 | 335/229 |
| 7,999,421 B2* | 8/2011 | Kim | H02K 33/18 | 310/15 |
| 8,138,650 B2* | 3/2012 | Shiga | H02K 1/2786 | 29/598 |
| 8,269,379 B2* | 9/2012 | Dong | H02K 33/16 | 310/28 |
| 8,314,519 B2* | 11/2012 | Eckstein | F16H 25/20 | 310/12.01 |
| 8,368,268 B2* | 2/2013 | Hasegawa | G02B 21/248 | 359/381 |
| 8,446,055 B2* | 5/2013 | Jun | H02K 33/16 | 310/23 |
| 8,829,741 B2* | 9/2014 | Park | B06B 1/045 | 310/25 |
| 8,878,401 B2* | 11/2014 | Lee | H02K 33/16 | 310/15 |
| 9,225,265 B2* | 12/2015 | Oh | H02N 2/001 | |
| 9,906,109 B2* | 2/2018 | Endo | H02K 33/16 | |
| 10,033,257 B2* | 7/2018 | Zhang | H02K 33/12 | |
| 10,236,761 B2* | 3/2019 | Wang | H02K 33/16 | |
| 10,447,133 B2* | 10/2019 | Jin | H02K 33/18 | |
| 10,491,067 B2* | 11/2019 | Fraser | H02K 1/2786 | |
| 10,547,233 B2* | 1/2020 | Jin | H02K 5/04 | |
| 10,566,888 B2* | 2/2020 | Degner | H02K 33/18 | |
| 10,596,594 B2* | 3/2020 | Ling | H02K 33/02 | |
| 10,674,278 B2* | 6/2020 | Zhou | H04R 9/025 | |
| 10,763,732 B2* | 9/2020 | Liu | H02K 33/18 | |
| 10,847,296 B2* | 11/2020 | Wauke | H01F 7/126 | |
| 11,205,937 B2* | 12/2021 | Song | H02K 5/24 | |
| 11,309,808 B1* | 4/2022 | Li | H02K 35/02 | |
| 2006/0066164 A1* | 3/2006 | Kim | H02K 7/063 | 310/81 |
| 2006/0103253 A1* | 5/2006 | Shiga | H02K 1/2786 | 310/43 |
| 2006/0133218 A1* | 6/2006 | Matthey | B06B 1/045 | 368/230 |
| 2009/0051471 A1* | 2/2009 | Zhao | H01F 7/1607 | 335/261 |
| 2009/0096299 A1* | 4/2009 | Ota | B06B 1/045 | 310/25 |
| 2009/0096314 A1* | 4/2009 | Atarashi | H02K 16/02 | 310/156.53 |
| 2010/0213885 A1* | 8/2010 | Ichiyama | H02K 21/12 | 310/156.46 |
| 2010/0302752 A1* | 12/2010 | An | H02K 33/06 | 361/807 |
| 2011/0133577 A1* | 6/2011 | Lee | H02K 33/18 | 310/15 |
| 2011/0156500 A1* | 6/2011 | Dong | H02K 33/16 | 310/25 |
| 2011/0198949 A1* | 8/2011 | Furuich | H02K 33/16 | 310/25 |
| 2011/0266892 A1* | 11/2011 | Wauke | H02K 33/18 | 310/25 |
| 2011/0285238 A1* | 11/2011 | Kusase | H02K 16/04 | 310/156.48 |
| 2011/0316361 A1* | 12/2011 | Park | H02K 33/16 | 310/25 |
| 2012/0169148 A1* | 7/2012 | Kim | H02K 33/16 | 310/25 |
| 2012/0200187 A1* | 8/2012 | Sano | H02K 1/2766 | 310/156.07 |
| 2012/0228965 A1* | 9/2012 | Bang | H02K 21/12 | 310/156.02 |
| 2012/0313459 A1* | 12/2012 | Zhang | H02K 33/18 | 310/25 |
| 2013/0061736 A1* | 3/2013 | Wauke | G10H 1/42 | 84/736 |
| 2013/0093276 A1* | 4/2013 | Kim | H02K 16/00 | 310/114 |
| 2013/0099600 A1* | 4/2013 | Park | B06B 1/045 | 310/15 |
| 2013/0099602 A1* | 4/2013 | Park | H02K 33/16 | 310/25 |
| 2013/0270955 A1* | 10/2013 | Lillington | H02K 1/2773 | 29/598 |
| 2013/0307363 A1* | 11/2013 | Sano | H02K 1/27 | 310/156.01 |
| 2014/0035397 A1* | 2/2014 | Endo | H02K 33/18 | 310/30 |
| 2014/0062225 A1* | 3/2014 | Kim | H02K 33/00 | 310/15 |
| 2014/0077628 A1* | 3/2014 | Yamada | H02K 33/12 | 310/12.16 |
| 2014/0084710 A1* | 3/2014 | Endo | H02K 33/16 | 310/25 |
| 2015/0137627 A1* | 5/2015 | Katada | H02K 33/16 | 310/25 |
| 2015/0137628 A1* | 5/2015 | Endo | H02K 33/16 | 310/25 |
| 2015/0194870 A1* | 7/2015 | Kim | H02K 33/18 | 310/25 |
| 2015/0206639 A1* | 7/2015 | Odajima | B06B 1/045 | 335/235 |
| 2016/0094115 A1* | 3/2016 | Okawa | A61C 17/3445 | 310/25 |
| 2016/0164389 A1* | 6/2016 | Jang | H02K 7/116 | 310/20 |
| 2016/0218607 A1* | 7/2016 | Oh | H02K 33/16 | |
| 2017/0019011 A1* | 1/2017 | Wang | H02K 33/16 | |
| 2017/0033653 A1* | 2/2017 | Wang | H02K 33/16 | |
| 2017/0033669 A1* | 2/2017 | Xu | H02K 33/16 | |
| 2017/0070131 A1* | 3/2017 | Degner | H02K 33/00 | |
| 2017/0104401 A1* | 4/2017 | Umehara | H02K 33/06 | |
| 2017/0214306 A1* | 7/2017 | Katada | H02K 33/16 | |
| 2017/0214307 A1* | 7/2017 | Katada | B06B 1/045 | |
| 2018/0056329 A1* | 3/2018 | Akanuma | H02K 33/16 | |
| 2018/0219465 A1* | 8/2018 | Katada | B06B 1/045 | |
| 2018/0241295 A1* | 8/2018 | Zu | H02K 33/14 | |
| 2018/0250107 A1* | 9/2018 | Dai | A61C 17/221 | |
| 2019/0044425 A1* | 2/2019 | Zu | H02K 33/02 | |
| 2019/0151895 A1* | 5/2019 | Takahashi | H02K 33/18 | |
| 2019/0206601 A1* | 7/2019 | Wauke | B06B 1/045 | |
| 2021/0194342 A1* | 6/2021 | Kitahara | H02K 33/16 | |

* cited by examiner

VIBRATING WITH STOP MAGNETS, MANDREL AND GUIDING MEMBER

TECHNICAL FIELD

The present invention relates to the field of vibration motors and, particularly, relates to a vibration motor with high reliability.

BACKGROUND

A vibration motor is a component that converts electrical energy into mechanical energy using the principle for generating electromagnetic force. The vibration motor is usually installed in a portable mobile device to generate vibration feedback, such as vibration feedback in a mobile phone or a game machine.

In the related art, a vibration motor includes a housing having a receiving space, a vibrator received in the receiving space, and a coil that drives the vibrator to reciprocate. The vibrator is usually supported by a spring structure and designed using a single-degree-of-freedom linear vibration theory.

However, as the vibration motor in the related art is supported by a spring structure, it is difficult to guarantee the reliability of the spring structure, the vibration motor has a narrow vibration frequency band, and the spring structure also limits the moving position of the vibrator, making the stroke of the vibration motor small. Moreover, the vibrator of the vibration motor has a risk of hitting the housing when vibrating, resulting in noise and affecting use.

Therefore, it is necessary to provide an improved vibration motor to solve the above problem.

SUMMARY

The present invention provides a vibration motor with high reliability to solve the technical problem in the related art that the vibration motor is supported by a spring structure, it is thus difficult to guarantee the reliability of the spring structure, and the vibrator of the vibration motor has a high risk of hitting the housing, resulting in noise.

A vibration motor includes: a housing having a receiving space; a vibrator received in the receiving space; two stop assemblies received in the receiving space and spaced apart from each other; and coils configured to drive the vibrator to reciprocate between the two stop assemblies. The vibrator includes first magnets spaced apart from each other and at least one second magnet arranged between the first magnets, every two adjacent first magnets of the first magnets have opposite magnetization directions, and a magnetization direction of each of the at least one second magnet is perpendicular to a magnetization direction of each of the first magnets.

As an improvement, each of the first magnets is magnetized along a direction perpendicular to a vibration direction of the vibrator, and each of the at least one second magnet is magnetized along a direction parallel to the vibration direction.

As an improvement, the vibrator further includes a mandrel reciprocating between the two stop assemblies, and each of the first magnets and the at least one second magnet is annular and surrounds the mandrel.

As an improvement, the vibration motor further includes a guiding member arranged along the vibration direction and having two ends fixed to the housing, the mandrel is provided with a fixing hole penetrating therethrough along the vibration direction, and the guiding member is inserted in the fixing hole in such a manner that the mandrel is connected to the guiding member along the vibration direction in a slidable way.

As an improvement, a projection of the mandrel along the vibration direction is rectangular, the mandrel includes four side walls connected end to end, each of the first magnets includes four first magnet units respectively fixed to the four side walls, and the four first magnet units are arranged in a ring to define the first magnet.

As an improvement, each of the at least one second magnet includes four second magnet units respectively fixed to the four side walls, and the four second magnet units are arranged in a ring to define the second magnet.

As an improvement, a projection of the mandrel along a direction perpendicular to the vibration direction is circular, and each of the first magnets and the at least one second magnet is of a circular ring and is fixed around the mandrel.

As an improvement, each of the two stop assemblies includes a first stop magnet which is magnetized along the vibration direction, and a magnetic pole of a side of the first stop magnet close to one first magnet of the first magnets adjacent thereto is identical to a magnetic pole of a side of the one first magnet close to the housing.

As an improvement, the first stop magnet is annular, each of the two stop assemblies includes a second stop magnet arranged at an inner side of the first stop magnet, the second stop magnet is magnetized along the vibration direction, and magnetic poles of the first stop magnet are arranged reversely to magnetic poles of the second stop magnet.

As an improvement, a projection of the first stop magnet along the vibration direction completely overlaps with a projection of the one first magnet along the vibration direction.

As an improvement, the housing includes a cylindrical main body having the receiving space, and two end caps respectively covering two ends of the main body, and the guiding member is fixed to the two end caps.

As an improvement, the first stop magnet and the second stop magnets are fixed to the two end caps, respectively, the second stop magnet has a through hole penetrating therethrough along the vibration direction, and the guiding member passes through the through hole to be fixed to the two end caps.

As an improvement, the coils are fixed to the cylindrical main body, each of the coils surrounds and is spaced apart from one first magnet of the first magnets, and a winding direction of the coil is the vibration direction.

As an improvement, the coils include at least two coils, and currents flowing on every two adjacent coils of the at least two coils have opposite directions.

As an improvement, a magnetic pole of a side of each of the at least one second magnet close to one first magnet of the first magnets adjacent thereto is identical to a magnetic pole of a side of the one first magnet close to the housing.

Compared with the related art, in the vibration motor provided by the present invention, the stop assemblies can effectively prevent the vibrator from hitting the housing when the vibrator vibrates, avoiding the reliability problem when a spring structure is adopted and improving the reliability of the vibration motor.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The technical solutions in the embodiments of the present invention will be clearly and completely described below in conjunction with the accompanying drawings. The described embodiments are merely some embodiments, rather than all embodiments, of the present invention. Based on the embodiments of the present invention, all other embodiments derived by a person of ordinary skill in the art without creative efforts shall fall within the protection scope of the present invention.

Embodiment 1

Figure 1:
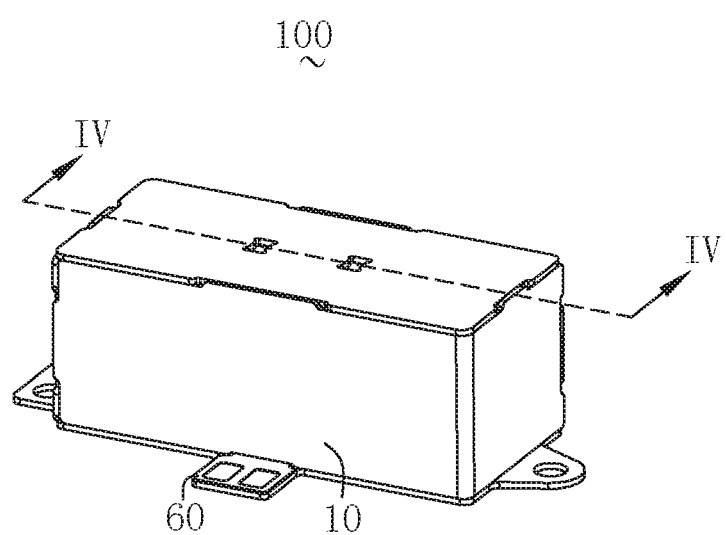
FIG. 1 illustrates a schematic perspective view of a vibration motor according to Embodiment 1 of the present invention.
Figure 2:
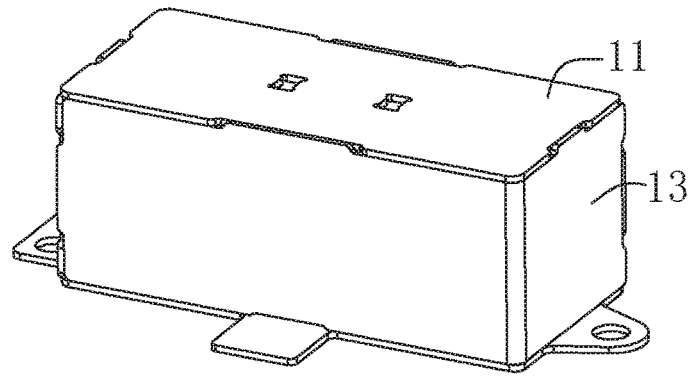
FIG. 2 illustrates an exploded schematic view of the vibration motor shown in FIG. 1.
Figure 2:
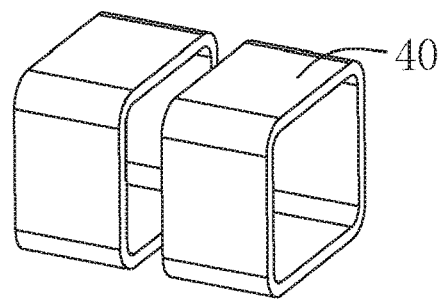
Figure 2:
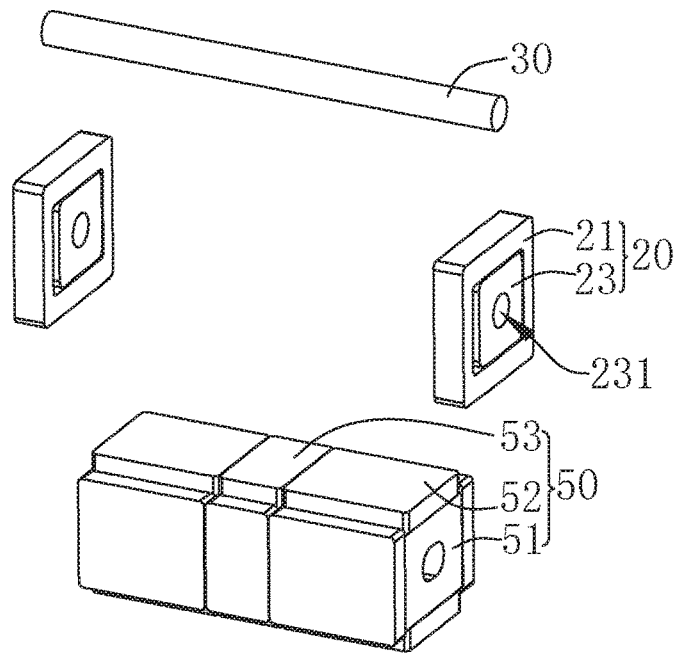
Figure 2:

Please refer to FIGS. 1-2. This embodiment provides a vibration motor 100 which includes a housing 10 having a receiving space, stop assemblies 20 and a guiding member 30 which are received in the receiving space and fixed to the housing 10, coils 40 fixed to the housing 10, a vibrator 50 received in the receiving space, and a flexible circuit board 60 which is fixed to the housing 10 and is electrically connected to the coils 40. The vibrator 50 is sleeved on the guiding member 30. The stop assemblies 20 face the vibrator 50, and are spaced apart from the vibrator 50. The coils 40 are configured to drive the vibrator 50 to make reciprocating motion.

The housing 10 includes a cylindrical main body 11, and end caps 13 covering two ends of the main body 11 respectively.

The stop assemblies 20 is configured to prevent the vibrator 50 from colliding with the housing 10. Two stop assemblies 20 are included. The two stop assemblies 20 are arranged at and spaced apart from two ends of the vibrator 50 along a vibration direction of the vibrator 50, respectively. For example, the two stop assemblies 20 are respectively received in the receiving space and respectively fixed on the two end caps 13. Each stop assembly 20 includes a first stop magnet 21 and a second stop magnet 23 that are magnetized in the vibration direction. The first stop magnet 21 and the second stop magnet 23 are fixed to the end cap 13. The second stop magnet 23 is arranged at an inner side of the first stop magnet 21. The first stop magnet 21 and the second stop magnet 23 are configured to provide repulsive forces to the vibrator 50 to prevent the vibrator 50 from colliding with the end cap 13.

The guiding member 30 is cylindrical and arranged along the vibration direction. Two ends of the guiding member 30 are fixed to the two end caps 13, respectively. The vibrator 50 is sleeved on the guiding member 30 and can be driven by the coils 40 to vibrate along the arrangement direction of the guiding member 30. For example, the second stop magnet 23 is provided with a through hole 231 penetrating therethrough along the vibration direction and facing towards the guiding member 30. The guiding member 30 passes through the through hole 231 to be fixedly connected to the end cap 13.

Two coils 40 are included. The two coils 40 are sequentially spaced apart from each other along the vibration direction of the vibrator 50. A winding direction of the coil 40 is along the vibration direction. Directions of passing currents on the two coils 40 are opposite to each other. In this embodiment, the two coils 40 are both received in the receiving space and are arranged around and fixedly connected to the main body 11.

The vibrator 50 reciprocates between the two stop assemblies 20. The vibrator 50 includes a mandrel 51 reciprocating between the two stop assemblies 20, two first magnets 52 spaced apart from each other, and a second magnet 53 arranged between the two first magnets 52. The adjacent first magnets 52 have opposite magnetization directions. A magnetization direction of the second magnet 53 is perpendicular to the magnetization directions of the first magnets 52. The two coils 40 surround and are spaced apart from the two first magnets 52, respectively. A magnetic pole of a side of the second magnet 53 close to one first magnet 52 adjacent thereto is the same as a magnetic pole of a side of the one first magnet 52 close to the coil 40. The thus arranged first magnets 52 and second magnet 53 are beneficial for improving BL and enhancing magnetic field performance.

Figure 3:
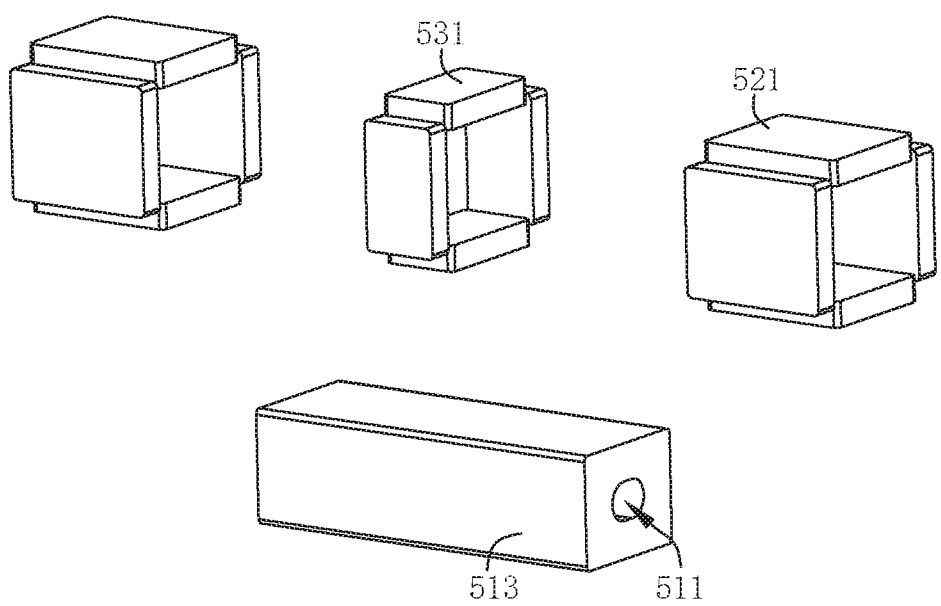
FIG. 3 illustrates an exploded schematic view of the vibrator shown in FIG. 2.
Figure 4:
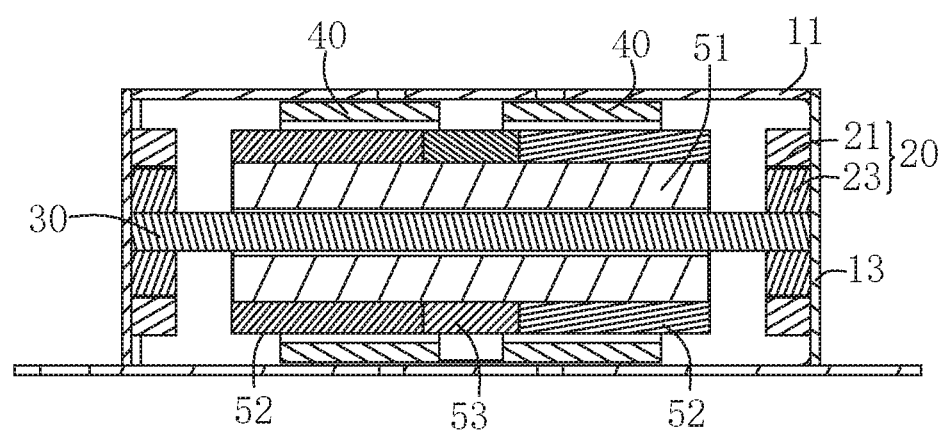
FIG. 4 is a sectional view taken along IV-IV in FIG. 1.

In conjunction with FIG. 3 and FIG. 4, the first magnets 52 and the second magnet 53 are all annular. The first magnets 52 and the second magnet 53 are arranged around the mandrel 51. The mandrel 51 has a hollow structure and is sleeved on the guiding member 30. For example, the mandrel 51 is provided with a fixing hole 511 along the vibration direction, and the guiding member 30 is correspondingly inserted into the fixing hole 511 in such a manner that the mandrel 51 is connected to the guiding member 30 along the vibration direction in a slidable way.

A projection of the mandrel 51 in the vibration direction is rectangular. The mandrel 51 includes four side walls 513 connected to one another in sequence. Each first magnet 52 includes four first magnet units 521 that are fixed on the four side walls 513, respectively. The four first magnet units 521 enclose to form the first magnet 52. The second magnet 53 includes four second magnet units 531 that are fixed on the four side walls 513, respectively. The four second magnet units 531 enclose to form the second magnet 53.

The second stop magnet 23 faces the mandrel 51. The first stop magnet 21 faces the first magnet 52. For example, the two second stop magnets 23 face two ends of the mandrel 51, respectively. The two first stop magnets 21 face the two first magnets 52, respectively.

Figure 5:
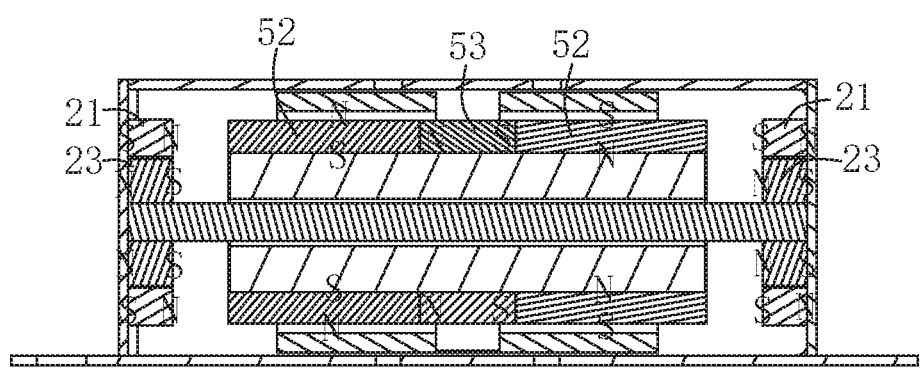
FIG. 5 illustrates a magnetic pole distribution of the structure shown in FIG. 4.
Figure 6:
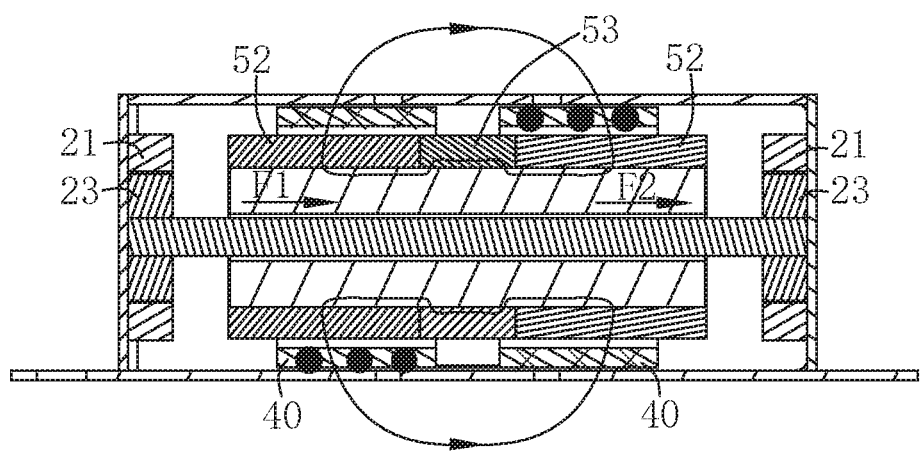
FIG. 6 illustrates a driving principle of the structure shown in FIG. 4.
Figure 7:
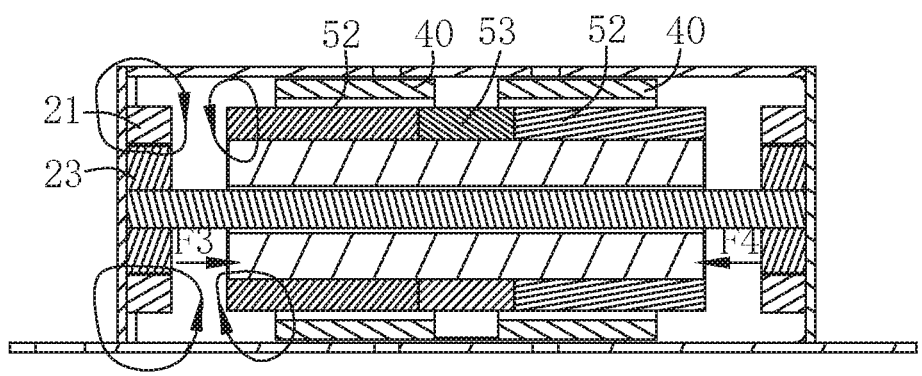
FIG. 7 illustrates an anti-collision principle of the structure shown in FIG. 4.

Referring to FIG. 5 to FIG. 7, the first magnets 52 are magnetized in a direction perpendicular to the vibration direction. The adjacent magnetic poles of the two first magnets 52 are opposite to each other. The second magnet 53 is magnetized in a direction parallel to the vibration direction. A magnetic pole of a side of the second magnet 53 adjacent to one of the two first magnets 52 is the same as a magnetic pole of a side of the one first magnet 52 close to the main body 11. The first stop magnet 21 and the second stop magnet 23 are magnetized in a direction parallel to the vibration direction. Magnetic poles of the first stop magnet 21 are arranged reversely to magnetic poles of the second stop magnet 23. A magnetic pole of a side of the first stop magnet 21 close to the first magnet 52 is the same as a magnetic pole of a side of the first magnet 52 close to the main body 11.

The first magnets 52 and the second magnet 53 in the vibrator 50 form a magnetic force line loop distributed along the vibration direction. The two coils 40, when respectively energized by the flexible circuit board 60, form Ampere's forces F1 and F2, respectively. Since the current directions of the two coils 40 are opposite to each other, the acting directions of the Ampere's forces F1 and F2 are identical. At the same time, the stop assemblies 20 at the two ends of the vibrator 50 will provide nonlinear repulsive forces F3 and F4 to the vibrator 50, so that the vibrator 50 is subjected to a combined force F=F1+F2+F3−F4−f, where f is a friction between the vibrator 50 and other components. In this embodiment, f is a friction between the vibrator 50 and the guiding member 30. In other embodiments, if the vibrator 50 is in contact with the housing 10, f is a friction between the vibrator 50 and the housing 10. By controlling the current signals passing through the two coils 40, the reciprocating movement of the vibrator 50 is realized. When the vibrator 50 approaches the stop assembly 20, the stop assembly 20 provides a repulsive force to the vibrator 50 to provide support and prevent the vibrator 50 from colliding with the stop assembly 20.

It can be understood that by use of the stop assembly 20 in the vibration motor 100, not only the vibrator 50 is prevented from colliding with the housing 10, but also the use of a spring structure is avoided, thereby improving reliability. Moreover, the internal space of the housing 10 is also saved, so that the vibration motor 100 has a wider vibration frequency band and can move with a large stroke.

Embodiment 2

Figure 8:
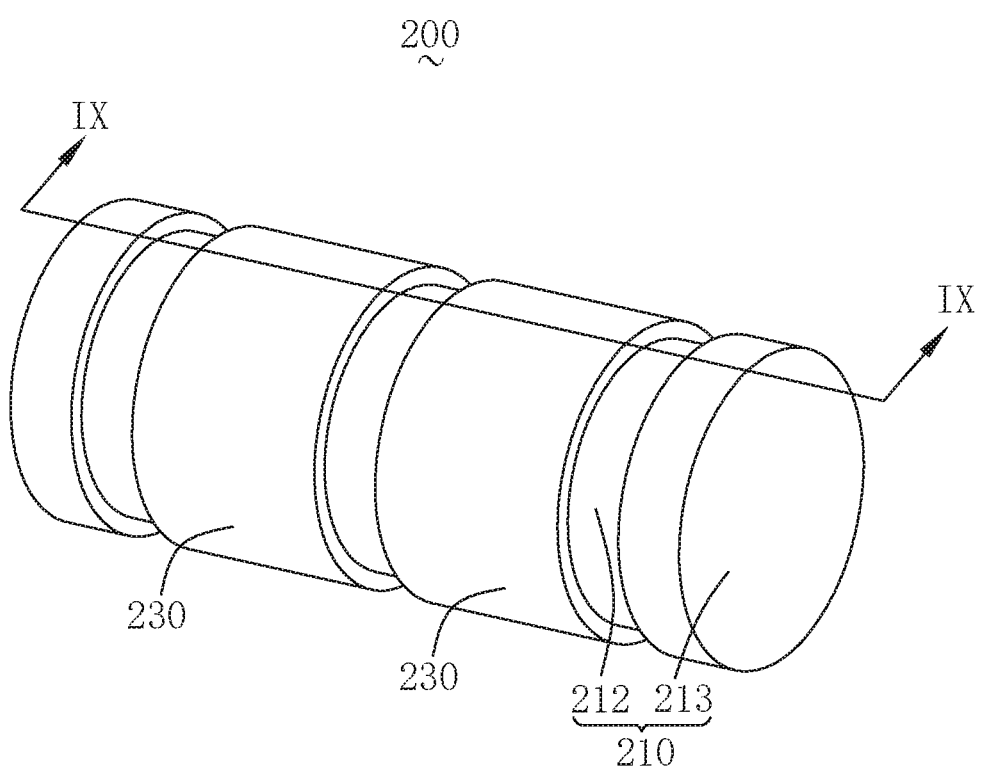
FIG. 8 illustrates a schematic perspective view of a vibration motor according to Embodiment 2 of the present invention.
Figure 9:
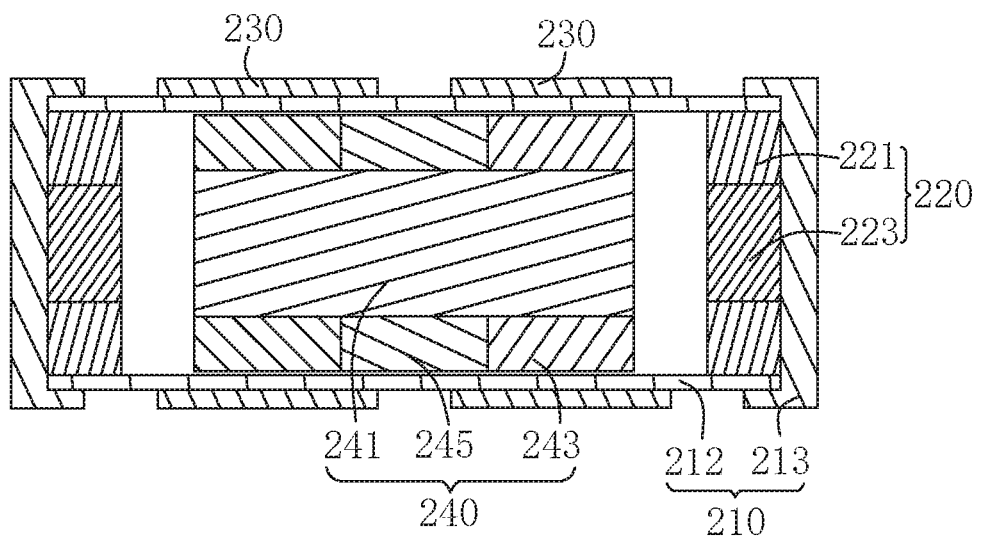
FIG. 9 is a sectional view taken along IX-IX in FIG. 8.

Referring to FIG. 8 and FIG. 9, this embodiment provides a vibration motor 200 including a housing 210 having a receiving space, stop assemblies 220 received in the receiving space and fixed to the housing 10, coils 230 fixed to the housing 210, and a vibrator 240 received in the receiving space. The stop assemblies 220 face the vibrator 240 and are spaced apart from the vibrator 240. The coils 230 are configured to drive the vibrator 240 to make reciprocating movements.

The housing 210 includes a cylindrical main body 212 and two end caps 213 spaced apart from each other. The two end caps 213 cover openings at two ends of the main body 212 respectively to jointly enclose the receiving space. The vibrator 240 is arranged along an extending direction of the main body 212 (i.e., a direction from one end cap 213 to the other end cap 213). The vibrator 240 can vibrate along the extending direction of the main body 212.

The stop assemblies 220 are configured to prevent the vibrator 240 from colliding with the end caps 213. Two stop assemblies 220 are included. The two stop assemblies 220 are arranged on the two end caps 213, respectively. Each stop assembly 220 includes a first stop magnet 221 and a second stop magnet 223 that are magnetized in the vibration direction. The first stop magnet 221 is annular. The second stop magnet 223 is arranged at an inner side of the first stop magnet 221.

Two coils 230 are included. The two coils 230 are sequentially arranged and spaced apart from each other along the extending direction of the main body 212 (the vibration direction of the vibrator 240). The winding directions of the coils 230 are along the vibration direction. Directions of currents passing through the two coils 230 are opposite to each other. In this embodiment, the two coils 230 are both located outside the receiving space, surround the main body 212, and are fixedly connected to the main body 212.

The vibrator 240 includes a mandrel 241, two first magnets 243 spaced apart from each other, and a second magnet 245. The second magnet 245 is arranged between the two first magnets 243. Each of the two first magnets 243 and the second magnet 245 surrounds the mandrel 241. A projection of the first stop magnet 221 in the vibration direction completely overlaps with a projection of the first magnet 243 in the vibration direction.

A projection of the mandrel 241 in a direction perpendicular to the vibration direction is circular. The mandrel 241 faces towards and is spaced apart from the two end caps 213. Each of the first magnets 243 and the second magnet 245 is of a circular ring, and is fixed around the mandrel 241.

The second stop magnet 223 faces the mandrel 241. The first stop magnet 221 faces the first magnet 243.

The magnetic pole distribution of the first magnets 243, the second magnet 245, the first stop magnet 221 and the second stop magnet 223 is substantially the same as that of the first magnets 52, the second magnet 53, the first stop magnet 21 and the second stop magnet 23 in Embodiment 1. A manner in which the coils 230 drive the vibrator 240 to vibrate is substantially the same as the manner in which the coils 40 drive the vibrator 50 to vibrate in Embodiment 1, which will not be repeated here.

Embodiment 3

Figure 10:
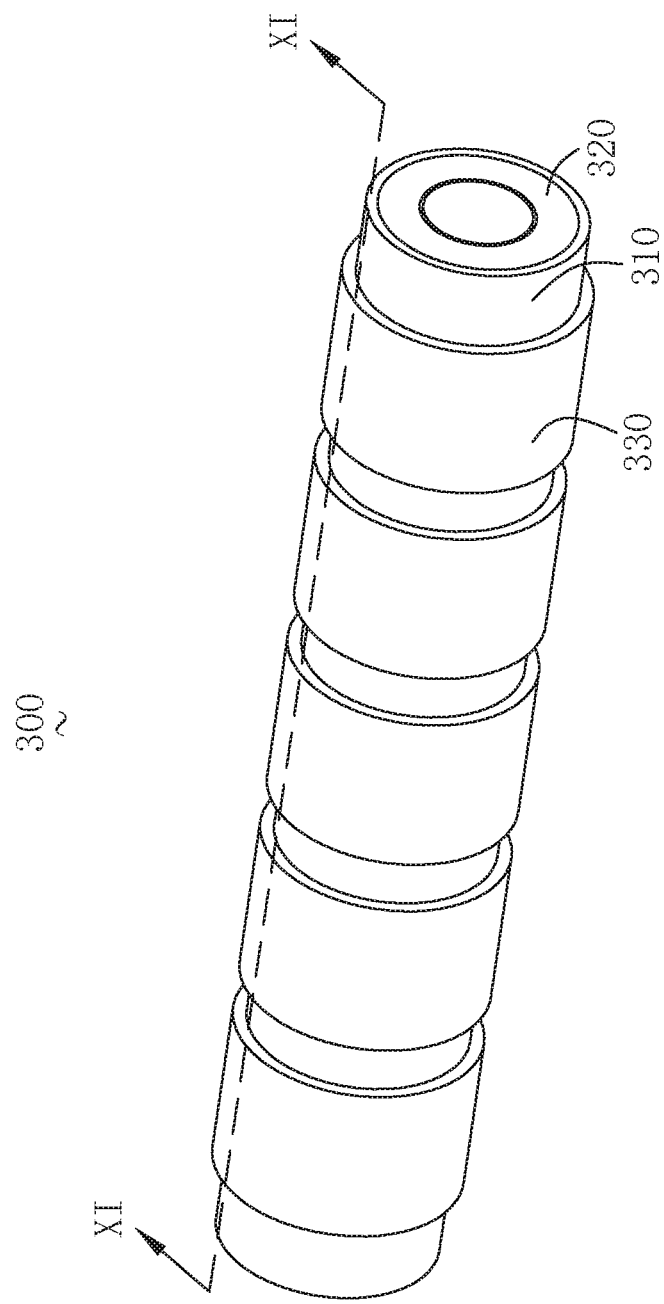
FIG. 10 illustrates a schematic perspective view of a vibration motor according to Embodiment 3 of the present invention.
Figure 11:
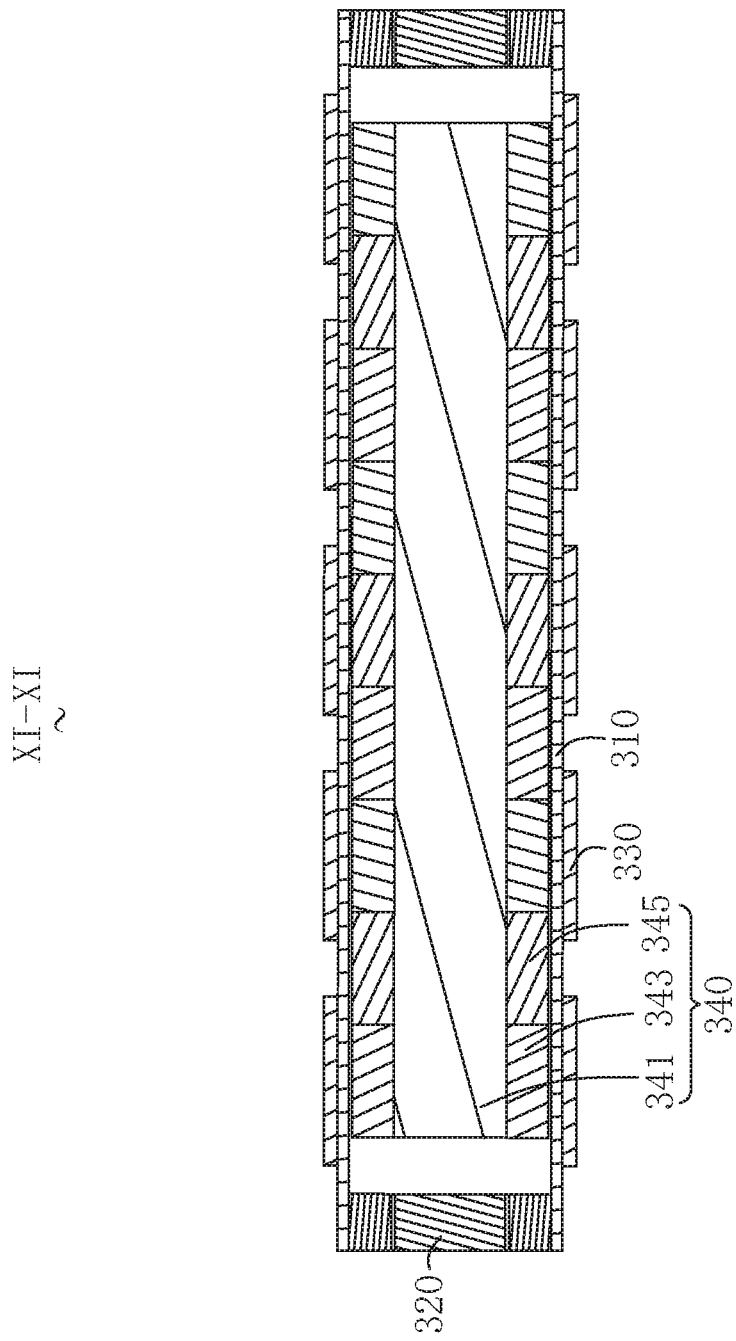
FIG. 11 is a sectional view taken along XI-XI in FIG. 10.

Referring to FIG. 10 and FIG. 11, this embodiment provides a vibration motor 300, which includes a housing 310 having a receiving space, stop assemblies 320 and coils 330 fixed on the housing 310, and a vibrator 340 received in the receiving space. The stop assemblies 320 face the vibrator 340 and are spaced apart from the vibrator 340. The coil 330 is configured to drive the vibrator 340 to make reciprocating movements.

The housing 310 is cylindrical and has two openings respectively at two ends. Two stop assemblies 320 are included. The two stop assemblies 320 are respectively arranged at the two openings of the housing 310 and encloses the receiving space with the housing 310.

The structure of the stop assembly 320 is substantially the same as that of the stop assembly 220 in Embodiment 2, which will not be repeated here.

The structure of the coil 330 is substantially the same as that of the coil 230 in Embodiment 2. The coils 330 are located outside the receiving space, surrounds the housing 310 and are fixed to the housing 310. In this embodiment, five coils 330 spaced apart from each other are included. Every two adjacent coils 330 have currents flowing in opposite directions.

T The vibrator 340 a mandrel 341, first magnets 343 and second magnets 345, each of the first magnets 343 and the second magnets 345 surrounding the mandrel 341. The mandrel 341 is substantially the same as the mandrel 241 in Embodiment 2. In this embodiment, five first magnets 343 spaced apart from each other and four second magnets 345 are included. Every two adjacent first magnets 343 sandwiches one second magnet 345. The first magnets 343 are magnetized in a direction perpendicular to the vibration direction. The second magnets 345 are magnetized in a direction parallel to the vibration direction. Magnetization directions of every two adjacent first magnets 343 are opposite to each other. A magnetic pole of a side of each second magnet 345 close to one first magnet 343 of the two adjacent first magnets 343 sandwiching the second magnet 345 is the same as a magnetic pole of a side of the one first magnet 343 close to the housing 310. A driving principle of the coils 330 driving the vibrator 340 to vibrate is substantially the same as the driving principle of the coils 40 driving the vibrator 50 to vibrate in Embodiment 1, which will not be repeated here.

It can be understood that in other embodiments, the number of the coils 330 and the number of the magnets in the vibrator 340 can be selected according to actual needs, as long as the magnetic force line loop formed by the magnets of the vibrator 340 is distributed along the vibration direction, and the acting directions of the Ampere's forces formed by the coils 330 are identical.

Compared with the related art, in the vibration motor provided by the present invention, the stop assemblies can effectively prevent the vibrator from impacting the housing when the vibrator vibrates, avoiding the reliability problem when a spring structure is adopted and improving the reliability of the vibration motor.

The above description are only some embodiments of the present invention, and it should be noted that those skilled in the art may also make improvements without departing from the principles of the present invention, and these improvements should fall within the protection scope of the present invention.

What is claimed is:

1. A vibration motor, comprising:
   a housing having a receiving space;
   a vibrator received in the receiving space;
   two stop assemblies received in the receiving space and spaced apart from each other; and
   coils configured to drive the vibrator to reciprocate between the two stop assemblies,
   wherein the vibrator comprises first magnets spaced apart from each other and at least one second magnet arranged between the first magnets, every two adjacent first magnets of the first magnets have opposite magnetization directions, and a magnetization direction of each of the at least one second magnet is perpendicular to a magnetization direction of each of the first magnets;
   wherein the vibrator further comprises a mandrel reciprocating between the two stop assemblies, and each of the first magnets and the at least one second magnet is annular and surrounds the mandrel;
   wherein the vibration motor further comprising a guiding member arranged along the vibration direction and having two ends fixed to the housing, wherein the mandrel is provided with a fixing hole penetrating therethrough along the vibration direction, and the guiding member is inserted in the fixing hole in such a manner that the mandrel is connected to the guiding member along the vibration direction in a slidable way;
   wherein a projection of the mandrel along the vibration direction is rectangular, the mandrel comprises four side walls connected end to end, each of the first magnets comprises four first magnet units respectively fixed to the four side walls, and the four first magnet units are arranged in a ring to define the first magnet.

2. The vibration motor as described in claim 1, wherein each of the at least one second magnet comprises four second magnet units respectively fixed to the four side walls, and the four second magnet units are arranged in a ring to define the second magnet.

3. The vibration motor as described in claim 1, wherein a projection of the mandrel along a direction perpendicular to the vibration direction is circular, and each of the first magnets and the at least one second magnet is of a circular ring and is fixed around the mandrel.

4. The vibration motor as described in claim 1, wherein each of the first magnets is magnetized along a direction perpendicular to a vibration direction of the vibrator, and each of the at least one second magnet is magnetized along a direction parallel to the vibration direction.

5. The vibration motor as described in claim 4, wherein a magnetic pole of a side of each of the at least one second magnet close to one first magnet of the first magnets adjacent thereto is identical to a magnetic pole of a side of the one first magnet close to the housing.

6. The vibration motor as described in claim 1, wherein each of the two stop assemblies comprises a first stop magnet which is magnetized along the vibration direction, and a magnetic pole of a side of the first stop magnet close to one first magnet of the first magnets adjacent thereto is identical to a magnetic pole of a side of the one first magnet close to the housing.

7. The vibration motor as described in claim 6, wherein the first stop magnet is annular, each of the two stop assemblies comprises a second stop magnet arranged at an inner side of the first stop magnet, the second stop magnet is magnetized along the vibration direction, and magnetic poles of the first stop magnet are arranged reversely to magnetic poles of the second stop magnet.

8. The vibration motor as described in claim 7, wherein a projection of the first stop magnet along the vibration direction completely overlaps with a projection of the one first magnet along the vibration direction.

9. The vibration motor as described in claim 7, wherein the housing comprises a cylindrical main body having the receiving space, and two end caps respectively covering two ends of the main body, and the guiding member is fixed to the two end caps.

10. The vibration motor as described in claim 9, wherein the first stop magnet and the second stop magnets are fixed to the two end caps, respectively, the second stop magnet has a through hole penetrating therethrough along the vibration direction, and the guiding member passes through the through hole to be fixed to the two end caps.

11. The vibration motor as described in claim 9, wherein the coils are fixed to the cylindrical main body, each of the coils surrounds and is spaced apart from one first magnet of the first magnets, and a winding direction of the coil is the vibration direction.

12. The vibration motor as described in claim 11, wherein the coils comprise at least two coils, and currents flowing on every two adjacent coils of the at least two coils have opposite directions.

* * * * *